Jan. 20, 1942.   A. R. BOZARTH   2,270,498
MANUFACTURE OF AMMONIUM BIFLUORIDE
Filed April 28, 1939

A.R. Bozarth  INVENTOR.
BY William H Brown
ATTORNEY.

Patented Jan. 20, 1942

2,270,498

UNITED STATES PATENT OFFICE 2,270,498

MANUFACTURE OF AMMONIUM BIFLUORIDE

Abe R. Bozarth, Cleveland, Ohio, assignor to The Harshaw Chemical Company, Elyria, Ohio, a corporation of Ohio Application April 28, 1939, Serial No. 270,601

4 Claims. (Cl. 23—88)

This invention relates to manufacture of ammonium bifluoride.

An object of the invention is to provide a process for production of this compound by direct union of $NH_3$ and HF, both in a substantially anhydrous state, and for the removal of the product from the reaction apparatus in the form of a finely divided solid.

A further object is to provide simple and cheap but effective apparatus for use in performing the novel process.

In my copending application, Serial No. 204,541, filed April 27, 1938, now Patent No. 2,156,273, issued May 2, 1939, I have described a similar method of producing $NH_4FHF$. In that patent, however, the product was recovered as a liquid and allowed to solidify as a mass or converted into flakes on a cooling drum. In accordance with the present invention, the product may be recovered in the form of a solid which is more finely divided and preferably takes a form which may be termed a snow, being a fine precipitate from a gas phase reaction. By proper control of the flow of reactants and cooling air a less finely divided material (solidified droplets) may be obtained with the form of apparatus shown in Fig. 1. It is, however, preferred to operate in a manner to produce a snow.

Figure 1:
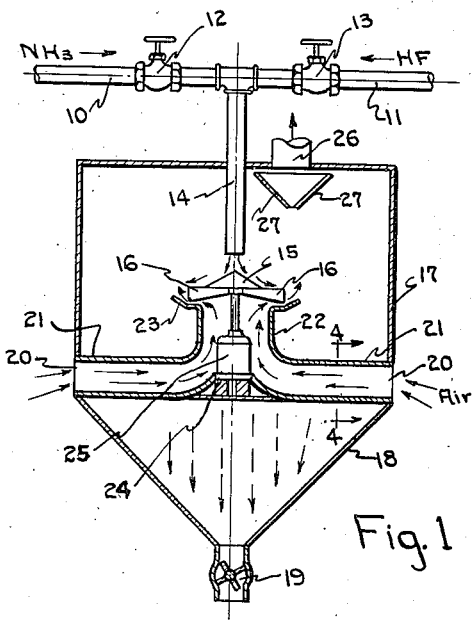
Figure 2:
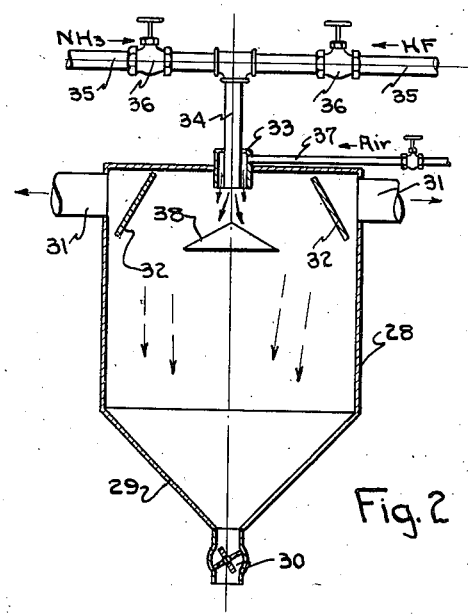
Figure 3:
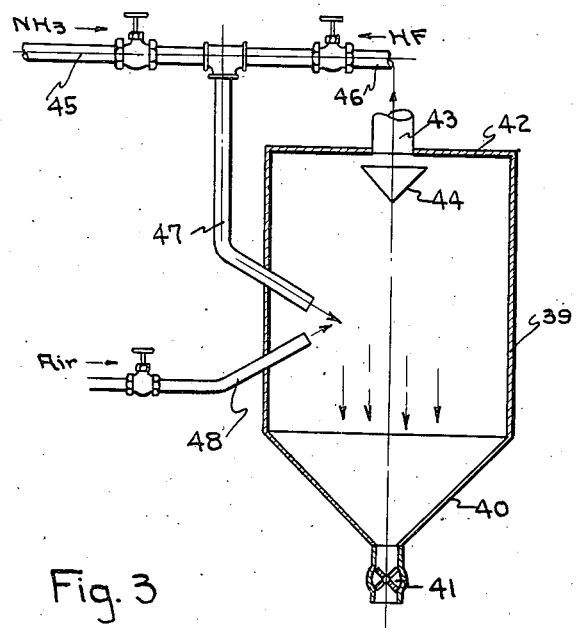
Figure 4:
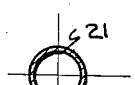

In the drawing, Fig. 1 is a schematic, vertical sectional view of an apparatus adapted to be used in practicing the invention; Fig. 2 is a similar view of a modified form of apparatus; Fig. 3 is a similar view of a further modified apparatus and Fig. 4 is a section on the line 4—4 of Fig. 1.

In Fig. 1 I have shown supply lines 10 and 11 for $NH_3$ and HF gases, it being understood that for regulation of temperature and the physical state of the product, the line 10 may supply a mixture of $NH_3$ and air or other inert gas while the line 11 may supply a mixture of HF and air or other inert gas. The flow of gases from the lines 10 and 11 is controlled by suitable valves 12 and 13 respectively. The so regulated gases are brought together in pipe section 14 and there react to form $NH_4FHF$, which, in gaseous state, impinges upon a rapidly revolving disk 15 and is distributed over the upper face thereof to an air stream created by fan elements 16 and is thereby cooled to a snow which settles down and is removed in that condition.

As will be clear from the drawing, the pipe section 14 extends into a closed chamber 17, having a hopper bottom 18 provided with a rotary discharge device 19 by means of which solid material may be continuously removed without permitting substantial passage of gas. Suitable air inlet openings 20 are provided near the top of the hopper portion 18. Attached to the vertical wall of the enclosure 17 in any suitable manner is an air-supply conduit in the form of a spider, each leg 21 of which has the cross-section indicated in Fig. 4 and registers with one of the openings 20. Centrally, the spider is provided with an upstanding cylindrical portion 22 terminating in an outwardly and upwardly directed flange 23. Suitably mounted on the spider is a motor support 24 upon which is mounted an electric motor 25. The armature of the motor 25 carries the disk 15 and the fan elements 16. At the top of the enclosure 17 is provided an air outlet 26 below which are baffles 27.

In operation, $NH_3$ and HF in anhydrous state (combined moisture content less than 5%) are brought together in the pipe section 14, the initial temperatures or compositions being so adjusted that $NH_4FHF$ impinges upon the disk 15 while still in gaseous condition. This gas enters the air stream formed by the fan elements 16 and shortly solidifies into a snow, which settles to the bottom and is removed through the discharge 19. By suitable control of the temperatures, it is possible to cause the $NH_4FHF$ to assume the form of small droplets before it is solidified, thereby varying the physical character of the resulting solid.

In Fig. 2 I have shown a modified form of apparatus wherein compressed air is used for chilling the gaseous $NH_4FHF$. In this view, the enclosure is indicated by the numeral 28 and the hopper bottom by the numeral 29. The bottom is provided with a rotary discharge 30 and air outlets 31 covered by baffles 32. Sealed through the top wall of the enclosure 28 is a cylindrical element 33 which surrounds the lower end of the reaction tube 34. The tube 34 is supplied with reactants through pipes 35 controlled by suitable valves 36. Compressed air is supplied from the line 37 to the interior of the element 33. A composite stream of air and $NH_4FHF$ impinges upon a suitably supported, conical, spreading element 38 and is converted into solid material which collects in the hopper 29 and is removed through the discharge 30.

As in the form shown in Fig. 1. suitable temperature control is maintained by control of the rate of flow of gases, proportion of diluent gas, if any, initial temperature of reactants and insulation where necessary. These factors preferably are controlled so that no solid material can collect on the spreading cone and preferably so that no liquid comes into contact therewith. The enclosure may be made relatively much larger than shown in the drawing for the purpose of reducing turbulence of gases therein.

In Fig. 3 I have shown an apparatus of very simple construction which is adapted especially for relatively low gas velocities. In this form, the enclosure is indicated by the numeral 39 and is provided with a hopper bottom 40 and a rotary discharge 41. The top wall 42 is provided with an air outlet 43 below which is a conical baffle 44. NH3 or a mixture thereof with air or other diluent gas is fed through supply line 45, while HF or a mixture thereof with air or other diluent is fed through a supply line 46. These gases are brought together and react in the pipe section 47 which delivers into the enclosure. Also delivering into the enclosure is an air duct 48, which is disposed at an angle to the pipe section 47 so that the gas streams mingle whereby the NH4FHF is chilled to a snow. The ends of the ducts 47 and 48 may be provided with special mixing nozzles such as slit openings parallel to each other, for higher gas velocities.

Broadly stated, the novel process comprises mixing gaseous ammonium bifluoride with a cooling gas whereby to convert the same into a solid, preferably a finely divided or a snow-like solid.

Ammonia and hydrofluoric acid, having not more than five percent of moisture are brought together in proportions of one mol NH3 to two mols HF, in a reaction chamber or space. The heat of reaction serves to maintain the product gaseous at the point of reaction. The gaseous reaction product is then mixed with air or other inert gas at a considerably lower temperature. Assuming a pressure of substantially one atmosphere, the temperature of the gas issuing from the reaction chamber should be above 240° C., the boiling point of ammonium bifluoride. It should not be higher than 300° C. and preferably not above 250° C. The cooling air, on the other hand, should be below 50° C. A very suitable temperature for the cooling air is 20° to 25° C. The resulting finely divided solid is allowed to settle and is then removed for use or sale.

Having thus described my invention, what I claim is:

1. A process of making ammonium bifluoride comprising contacting gaseous NH3 and gaseous HF in approximately the proportions in which they combine to form NH4FHF, both gases being substantially anhydrous, and contacting the resulting gaseous NH4FHF with air at a temperature below 50° C.

2. A process of making ammonium bifluoride comprising contacting gaseous NH3 and gaseous HF in approximately the proportions in which they combine to form NH4FHF, both gases being substantially anhydrous and contacting the resulting material at a temperature not lower than 240° C. with air at a temperature below 50° C.

3. A process of making ammonium bifluoride comprising contacting gaseous NH3 and gaseous HF in approximately the proportions in which they combine to form NH4FHF, both gases being substantially anhydrous and at least one thereof being diluted with air, and contacting the resulting material at a temperature not lower than 240° C. with air at a temperature below 50° C. whereby to precipitate a finely divided solid ammonium bifluoride.

4. A process for the manufacture of ammonium bifluoride in finely divided solid form which comprises producing a thin jet of air in an enclosure, maintaining said thin jet of air by supplying thereto air at a temperature below 50° C., and bringing into contact with said jet of air a gaseous body produced by bringing together NH3 and HF in approximately the proportions in which they combine to form NH4FHF, both the NH3 and the HF being substantially anhydrous and said gaseous body being at a temperature not lower than 240° C. before contact with said jet of air.

ABE R. BOZARTH.